(12) United States Patent
Bellamy et al.

(10) Patent No.: US 10,956,831 B2
(45) Date of Patent: Mar. 23, 2021

(54) DETECTING INTERACTION DURING MEETINGS

(71) Applicant: International Business Machines Corporation, Armonk, NY (US)

(72) Inventors: Rachel K. E. Bellamy, Bedford, NY (US); Jonathan H. Connell, II, Cortlandt-Manor, NY (US); Robert G. Farrell, Cornwall, NY (US); Brian P. Gaucher, Brookfield, CT (US); Jonathan Lenchner, North Salem, NY (US); David O. S. Melville, New York, NY (US); Valentina Salapura, Chappaqua, NY (US)

(73) Assignee: International Business Machines Corporation, Armonk, NY (US)

(*) Notice: Subject to any disclaimer, the term of this patent is extended or adjusted under 35 U.S.C. 154(b) by 653 days.

(21) Appl. No.: 15/810,462

(22) Filed: Nov. 13, 2017

(65) Prior Publication Data

US 2019/0147367 A1 May 16, 2019

(51) Int. Cl.
*G06N 20/00* (2019.01)
*G06K 9/00* (2006.01)
(Continued)

(52) U.S. Cl.
CPC ......... *G06N 20/00* (2019.01); *G06K 9/00335* (2013.01); *G06N 5/022* (2013.01); *G06Q 10/1095* (2013.01)

(58) Field of Classification Search
None
See application file for complete search history.

(56) References Cited

U.S. PATENT DOCUMENTS 6,970,931 B1   11/2005  Bellamy et al.
6,978,001 B1 * 12/2005  Shaffer ................... H04L 29/06
                                              370/260
(Continued)

FOREIGN PATENT DOCUMENTS

WO      2014145228 A1    9/2014

OTHER PUBLICATIONS

Al-Hames et al., "Audio-Visual Processing in Meetings: Seven Questions and Current AMI Answers", MLMI 2006, LNCS 4299, pp. 24-35, 2006, © Springer-Verlag Berlin Heidelberg 2006.
(Continued)

*Primary Examiner* — Arpan P. Savla
*Assistant Examiner* — Maria S Ayad
(74) *Attorney, Agent, or Firm* — William H. Hartwell

(57) ABSTRACT

In one embodiment, in accordance with the present invention, a method, computer program product, and system for performing actions based on captured interpersonal interactions during a meeting is provided. One or more computer processors capture the interpersonal interactions between people in a physical space during a period of time, using machine learning algorithms to detect the interpersonal interactions and a state of each person based on vision and audio sensors in the physical space. The one or more computer processors analyze and categorize the interactions and state of each person, and tag representations of each person with the respectively analyzed and categorized interactions and states of the respective person over the period of time. The one or more computer processors then take an action based on the analysis.

20 Claims, 11 Drawing Sheets

(51) Int. Cl.
  *G06N 5/02* (2006.01)
  *G06Q 10/10* (2012.01)

(56) References Cited

U.S. PATENT DOCUMENTS

| | | | |
|---|---|---|---|
| 8,154,583 B2 | 4/2012 | Kurtz et al. | |
| 8,243,116 B2 | 8/2012 | Qvarfordt et al. | |
| 9,609,030 B2 | 3/2017 | Sun et al. | |
| 2005/0131744 A1* | 6/2005 | Brown | G06K 9/00315 705/7.29 |
| 2007/0211141 A1* | 9/2007 | Christiansen | H04L 29/06027 348/14.08 |
| 2011/0020781 A1* | 1/2011 | Yang | G09B 7/00 434/350 |
| 2011/0263946 A1* | 10/2011 | el Kaliouby | G06K 9/00335 600/300 |
| 2011/0267422 A1* | 11/2011 | Garcia | H04N 7/15 348/14.16 |
| 2013/0007635 A1* | 1/2013 | Michaelis | H04M 3/56 715/753 |
| 2013/0120522 A1* | 5/2013 | Lian | H04N 7/15 348/14.08 |
| 2013/0124623 A1* | 5/2013 | Munter | H04L 65/4038 709/204 |
| 2013/0271560 A1* | 10/2013 | Diao | H04N 7/15 348/14.08 |
| 2014/0145936 A1* | 5/2014 | Gu | G06F 3/0304 345/156 |
| 2014/0192141 A1* | 7/2014 | Begeja | H04N 7/15 348/14.08 |
| 2015/0085061 A1* | 3/2015 | Sun | G06F 3/0484 348/14.07 |
| 2015/0286858 A1* | 10/2015 | Shaburov | G06K 9/00281 382/103 |
| 2017/0286853 A1* | 10/2017 | Liensberger | H04L 67/22 |
| 2017/0364741 A1* | 12/2017 | Hau | G06K 9/72 |
| 2017/0374425 A1* | 12/2017 | Disley | G06Q 10/103 |
| 2018/0101824 A1* | 4/2018 | Nelson | G06Q 10/1095 |
| 2019/0289359 A1* | 9/2019 | Sekar | H04N 21/4722 |

OTHER PUBLICATIONS

Aran et al., "Cross-Domain Personality Prediction: From Video Blogs to Small Group Meetings", ICMI '13, 4 pages, Copyright is held by the owner/author(s), Publication rights licensed to ACM, ACM 978-1-4503-2129-7/13/12, <http://dx.doi.org/10.1145/2522848.2522858>.

Bradner et al., "The Adoption and Use of 'Babble': A Field Study of Chat in the Workplace*", (*To appear in the Proceedings of the European Conference on Computer-Supported Collaborative Work (ECSCW), Sep. 1999), 10 pages, printed on May 15, 2017, <http://www.pliant.org/personal/Tom_Erickson/AdoptionOfBabble.html>.

Cerekovic et al., "Rapport with Virtual Agents: What do Human Social Cues and Personality Explain?", Transactons on Affective Computing, This article has been accepted for publication in a future issue of this journal, but has not been fully edited, Content may change prior to final publication, 14 pages, DOI 10.1109/TAFFC.2016.2545650, © 2015 IEEE.

Erickson et al., "Social Translucence—Designing Social Infrastructures That Make Collective Activity Visible", Communications of the ACM, Apr. 2002/vol. 45, No. 4, pp. 40-44, © 2002 ACM 0002-0782/02/0400.

Gatica-Perez, Daniel, "Signal Processing in the Workplace", Social Sciences, IEEE Signal Processing Magazine, Jan. 2015, pp. 121-125, Digital Object Identifier 10.1109/MSP.2014.2359247, Date of publication: Dec. 5, 2014, ©2015 IEEE.

Marcos-Ramiro et al., "Let Your Body Speak: Communicative Cue Extraction on Natural Interaction using RGBD Data", IEEE Transactions on Multimedia, vol. 17, No. 10, Oct. 2015, pp. 1721-1732, © 2015 IEEE.

Palmer, Barbara, "Can an App Capture Emotion at Meetings?", PCMA Convene®, Nov. 1, 2014, 4 pages, <http://www.pcmaconvene.org/departments/can-an-app-capture-emotion-at-meetings/>.

Schmid Mast et al., "Social Sensing for Psychology: Automated Interpersonal Behavior Assessment", Association for Psychological Science, Current Directions in Psychological Science, 2015, vol. 24(2) pp. 154-160, © The Author(s) 2015 Reprints and permissions: sagepub.com/journalsPermissions.nav, DOI: 10.1177/0963721414560811.

Singer, Natasha, "In a Mood? Call Center Agents Can Tell", Oct. 12, 2013, The New York Times, Business Day, Technophoria, 3 pages, <http://www.nytimes.com/2013/10/13/business/in-a-mood-call-center-agents-can-tell.html?pagewanted=1&_r=2&>.

"Method to Capture the Subject/Discussion Topic for a New Meeting Using Input from Historical Meeting Corpus using Cognitive Analytics", An IP.com Prior Art Database Technical Disclosure, Authors et. al.: Disclosed Anonymously, IP.com No. IPCOM000248626D, IP.com Electronic Publication Date: Dec. 22, 2016, 7 pages.

* cited by examiner

US 10,956,831 B2

DETECTING INTERACTION DURING MEETINGS

BACKGROUND

The present invention relates generally to the field of machine learning, and more particularly to utilizing machine learning to detect interaction during a meeting.

Online meetings, also referred to as web conferencing and video conferencing, began in the 1970s and greatly increased in the 1980s with the computer revolution and rapid growth of the internet. Video conferencing is a cost-effective solution today for holding business meetings with people in multiple locations (i.e., physical spaces), by reducing the need for business travel expenses such as hotel and airfares.

SUMMARY

Embodiments of the present invention disclose a method, computer program product, and system for performing actions based on captured interpersonal interactions during a meeting. One or more computer processors capture the interpersonal interactions between people in a physical space during a period of time, using machine learning algorithms to detect the interpersonal interactions and a state of each person based on vision and audio sensors in the physical space. The one or more computer processors analyze and categorize the interactions and state of each person, and tag representations of each person with the respectively analyzed and categorized interactions and states of the respective person over the period of time. The one or more computer processors then take an action based on the analysis.

DETAILED DESCRIPTION

Embodiments in accordance with the present invention detect and synchronously track one or more participants in a room, or set of rooms, with video and audio streams, and then use that set of simultaneous information streams to enhance highly dynamic meeting settings and to make the meetings much more interactive, transparent, effective, and productive.

Existing meeting analysis approaches analyze raw audio-visual streams from meetings and use results of the analysis to provide meeting summaries or to answer questions during or after the meeting, such as: What has been said during the meeting? What events and keywords occur in the meeting? Who and where are the persons in the meeting? Who in the meeting is acting or speaking? How do people act in the meeting? What are the participants' emotions in the meeting? Where or what is the focus of attention in meetings?

However, existing approaches do not take audio visual streams from a set of locations and combine them to create a rich, unified representation of the meeting incorporating the emotive states of the participants, the participants' agreement or disagreement on topics that have been raised during the meeting, a participant's reactions to other participants, and so on. Furthermore, the data from audio-visual streams is typically not combined with data such as meeting schedules, room states, and screen states to facilitate coordination and set-up of a physical and on-line meeting space across multiple meetings and long-running activities (activities that might intermittently make use of the meeting space over several weeks of months).

Embodiments in accordance with the present invention help remote and local participants feel more connected to a physical meeting. Certain things are easily perceived in person (emotion, agreement or disagreement, and whether people are attending to what is being presented) but are hard to tell if you are remote or across the room. It can also be difficult to get a global or summary view of this information for many locations. With the right information, however, people can make interactions that have more of an emotional connection, and can be more persuasive, and more engaging. Embodiments in accordance with the present invention provide methods of detecting and tracking participation in a meeting and generating interventions to improve the participation by utilizing one or more sensors in a physical and remote environment to detect emotional, attentional, and dispositional states. A unified meeting representation is maintained, and interventions are delivered using avatars.

Figure 1:
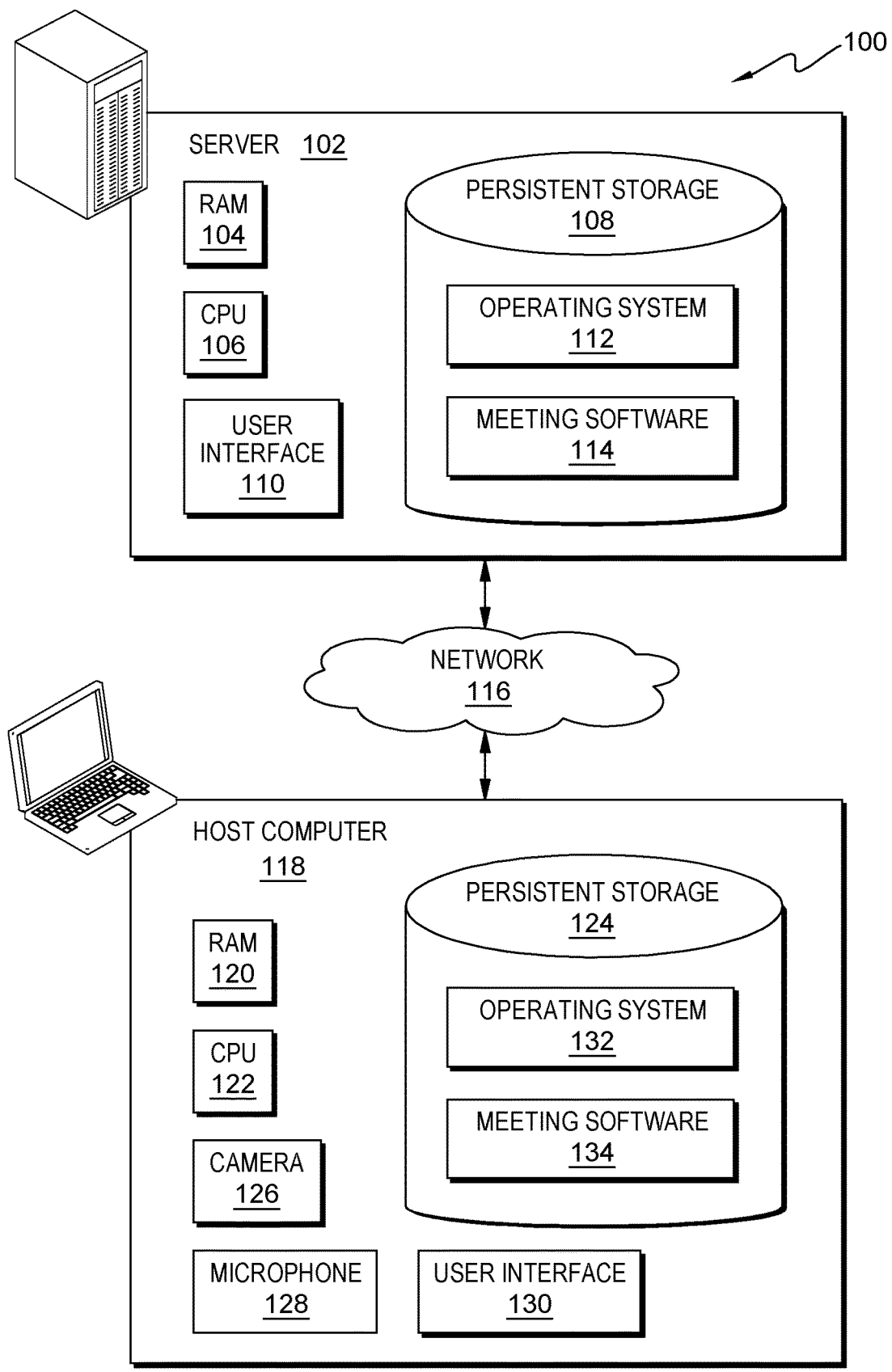
FIG. 1 is a functional block diagram illustrating a remote meeting environment, in an embodiment in accordance with the present invention.

Embodiments in accordance with the present invention will now be described in detail with reference to the Figures. FIG. 1 is a functional block diagram, generally designated 100, illustrating a remote meeting environment, in an embodiment in accordance with the present invention.

Remote meeting environment 100 includes server 102, computer 118, and other computing devices (not shown), all interconnected over network 116. Server 102 includes random access memory (RAM) 104, central processing unit (CPU) 106, persistent storage 108, and user interface 110. Server 102 may be a Web server, or any other electronic device or computing system, capable of processing program instructions and receiving and sending data. In some embodiments, server 102 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, server 102 may represent server computing systems utilizing multiple computers as a server system, such as in a distributed computing environment. In general, server 102 is representative of any electronic device or combinations of electronic devices capable of executing machine-readable program instructions and communicating with computer 118 via network 116 and with various components and devices (not shown) within remote meeting environment 100.

Server 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer readable storage medium that is capable of storing program instructions or digital information.

Server 102 includes user interface 110. User interface 110 is a program that provides an interface between a user of server 102 and a plurality of applications that reside on server 102 (e.g., meeting software 114) and/or may be accessed over network 116. A user interface, such as user interface 110, refers to the information (e.g., graphic, text, sound) that a program presents to a user and the control sequences the user employs to control the program. A variety of types of user interfaces exist. In one embodiment, user interface 110 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 110 sends and receives information through meeting software 114 to computer 118. Server 102 may include internal and external hardware components, as depicted and described in further detail with respect to FIG. 10.

Operating system 112 and meeting software 114 are stored in persistent storage 108. Operating system 112 enables server 102 to communicate with computer 118 and other computing devices (not shown) of remote meeting environment 100 over a data connection on network 116. Meeting software 114 enables server 102 to mine streams of video and audio, using machine learning algorithms, to identify, isolate and tag individuals, within a room or set of rooms and use those simultaneous video and audio streams, again using machine learning algorithms, to estimate state defined as: body or body component movement, gesture, eye movement/gaze and pupil dilation, pulse rate, and via infrared (IR), body heat, as well as individual and group dynamics/interaction. In addition, the algorithms are used to infer such things as individual and group emotion, meaning of gestures, eye movement/gaze/pupil dilation and use body heat and pulse rate as additional information sources and confirmation sources. Over a short period, the room(s) use machine learning algorithms to learn the behaviors of specific individuals and of a group and provide a time synchronous stream of outputs that can be used as input or feedback to the machine learning algorithms. This includes the option of tagging to attribute semantics to video and audio, and, in some cases, may be crowd-sourced. Over a long period, meeting software 114 also uses machine learning algorithms to continuously train and learn about short-term activities, new settings, meeting types, and interactions. In other example embodiments, meeting software 114 may be one or more components of operating system 112.

In FIG. 1, network 116 is shown as the interconnecting fabric between server 102, computer 118, and with various components and devices (not shown) within remote meeting environment 100. In practice, the connection may be any viable data transport network, such as, for example, a LAN or WAN. Network 116 can be for example, a local area network (LAN), a wide area network (WAN) such as the Internet, or a combination of the two, and include wired, wireless, or fiber optic connections. In general, network 116 can be any combination of connections and protocols that will support communications between server 102, computer 118, and with various components and devices (not shown) within remote meeting environment 100.

Computer 118 is included in remote meeting environment 100. Computer 118 includes random access memory (RAM) 120, central processing unit (CPU) 122, persistent storage 124, camera 126, and microphone 128. Computer 118 may be a Web server, or any other electronic device or computing system, capable of processing program instructions and receiving and sending data. In some embodiments, computer 118 may be a laptop computer, a tablet computer, a netbook computer, a personal computer (PC), a desktop computer, a personal digital assistant (PDA), a smart phone, or any programmable electronic device capable of communicating over a data connection to network 116. In other embodiments, computer 118 may represent server computing systems utilizing multiple computers as a server system, such as in a distributed computing environment. In general, computer 118 is representative of any electronic devices or combinations of electronic devices capable of executing machine-readable program instructions and communicating with server 102 via network 116 and with various components and devices (not shown) within remote meeting environment 100.

Computer 118 includes persistent storage 124. Persistent storage 124 may, for example, be a hard disk drive. Alternatively, or in addition to a magnetic hard disk drive, persistent storage 124 may include a solid state hard drive, a semiconductor storage device, read-only memory (ROM), erasable programmable read-only memory (EPROM), flash memory, or any other computer readable storage medium that is capable of storing program instructions or digital information. Operating system 132 and meeting software 134 are stored in persistent storage 124. Operating system 132 enables computer 118 to detect and establish a connection to communicate with server 102 and other computing devices (not shown) of remote meeting environment 100, over a data connection on network 116. Meeting software 134 enables a user of computer 118 to host a meeting in a unified meeting room with one or more additional participants and communicate with other computing devices (not shown) of remote meeting environment 100 over a data connection on network 116. Additionally, meeting software 134 can also communicate the one or more identified and tagged individuals within the room(s) and the determine state of the one or more identified and tagged individuals to the user of computer 118.

Computer 118 includes camera 126. Camera 126 enables a user of computer 118 to capture images or video streams of his/her self or the physical space surrounding the physical area of computer 118. In one example embodiment, a user of computer 118 can manually enable/disable camera 126. In other example embodiments, camera 126 can be enabled/disabled by meeting software 134. In yet another example embodiment, meeting software 114 can receive images and/or video data from camera 126 during an online meeting.

Computer 118 includes microphone 128. Microphone 128 enables a user of computer 118 to capture one or more audio streams of his/her self in the physical space surrounding the physical area of computer 118. In one example embodiment, a user of computer 118 can manually enable/disable microphone 128. In other example embodiments, microphone 128 can be enabled/disabled by meeting software 134. In yet another example embodiment, meeting software 114 can receive audio data from microphone 128 during an online meeting.

User interface 130 is included in computer 118. User interface 130 is a program that provides an interface between a user of computer 118 and a plurality of applications that reside on computer 118 (e.g., meeting software 134) and/or may be accessed over network 116. A user interface, such as user interface 130, refers to the information (e.g., graphic, text, sound) that a program presents to a user and the control sequences the user employs to control the program. A variety of types of user interfaces exist. In one embodiment, user interface 130 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 130 sends and receives information through meeting software 134 to server 102.

Figure 2:
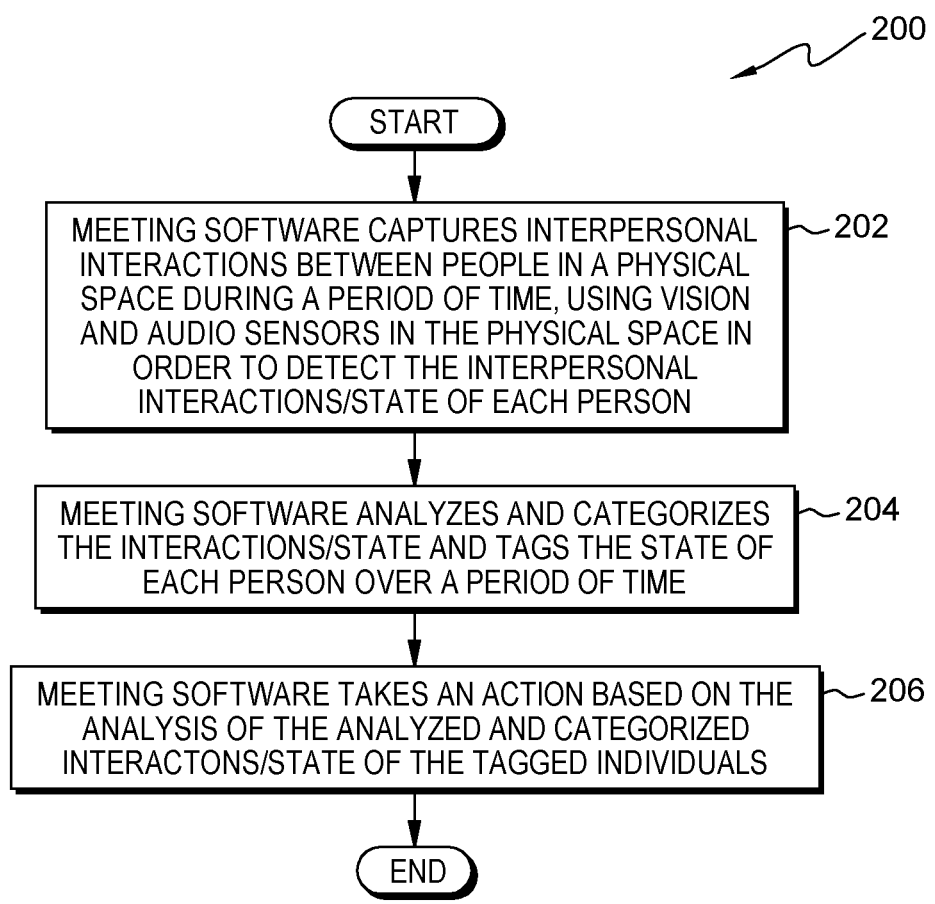
FIG. 2 is a flowchart depicting operational steps of a meeting software, on a server within the remote meeting environment of FIG. 1, in an embodiment in accordance with the present invention.

FIG. 2 is a flowchart, generally designated 200, depicting operational steps of a meeting software, on a server within the remote meeting environment of FIG. 1, in an embodiment in accordance with the present invention. In an example embodiment, a user is hosting an online meeting using computer 118, wherein computer 118 is connected to server 102 over a data connection on network 116.

Meeting software 114 captures interpersonal interactions between people in a physical space during a period of time, using vision and audio sensors in the physical space in order to detect the interpersonal interactions/state of each person as depicted in step 202. For example, the user hosting the meeting invites one or more participants to the online meeting. Upon joining the online meeting, meeting software 114 begins monitoring and capturing the interpersonal interactions between the one or more participants in their respective spaces (e.g., the physical spaces of the one or more participants). For example, meeting software 114 can collect data from camera 126, microphone 128, and meeting software 134 on computer 118 as well as data from the computing devices of the one or more participants, wherein the data is included in audio and video streams. In other example embodiments, meeting software 134 on computer 118 can collect the data from camera 126 and microphone 128 and transmit the data to meeting software 114 on server 102. Examples of interpersonal interactions include, but are not limited to, direct touch, a mutual gaze, a body position, a manipulation of a shared work-related object, one-on-one conversation, and a mutual gesture.

In step 204, meeting software 114 analyzes and categorizes the interactions/state and tags the state of each person over a period of time. For example, by analyzing the video stream of the meeting, meeting software 114 identifies "Rob", "Jon" and "Danny" as currently attending the meeting, wherein "Rob", "Jon" and "Danny" are tagged as part of the video stream. With additional analysis of the video stream, meeting software 114 can observe that Danny and Rob entered the room at about the same time, but Jon has been in the room for much of the day. From analysis of the audio portion of the video stream, or a separate audio stream of the meeting, meeting software 114 can discover that Rob is doing most of the talking with the occasional contribution by Danny, and Jon is saying nothing. In another example embodiment, meeting software 114 can detect that over the last ten previous meetings when Danny and Rob met, "Tom" was also included on the phone and had a shared on-line meeting. Meeting software 114 can then ask, via speech, or by putting up something on a screen, whether Danny and Rob would like to call Tom and set-up a meeting. If either Danny or Rob say yes, meeting software 114 can invite Tom to the current meeting or automatically set up a future meeting with "Rob", "Jon", "Danny", and "Tom". If Tom is available to join the meeting and accepts the invitation, meeting software 114 can add an additional tag for Tom to the audio and video streams.

Meeting software 114 analyzes and categorizes the interactions/state and tags the state of each person over a period of time by leveraging, and combining, the advances in vision and audio system technology with 'short and long term' machine learning algorithms. Short term machine learning algorithms are used by meeting software 114 to learn the behaviors of specific individuals and of a group and provide a time synchronous stream of outputs that can be used as feedback or input to the long-term machine learning algorithms. Long term machine learning algorithms are used by meeting software 114 to continuously train and learn about the short-term activities, new settings, meeting types and interactions of the meeting participants.

Meeting software 114 is able to mine audio and video streams and identify, isolate, and tag individuals, within a room or set of rooms, and use those simultaneous audio and video streams to determine one or more states for each person such as, a body or body component movement, a gesture, eye movement/gaze and pupil dilation, pulse rate, and via IR, body heat, as well as individual and group dynamics/interaction and tag those to individuals or groups. In addition, the algorithms will infer such things as individual and group emotion, meaning of gestures, eye movement/gaze/pupil dilation and use body heat and pulse rate as additional information sources and confirmation sources. For example, meeting software can determine and categorize the state of each individual as being supportive, antagonistic, and/or clarifying. Over a short period of time, meeting software 114 uses machine learning algorithms to learn the behaviors of specific individuals of a group and provide a time synchronous stream of outputs that can be used as input or feedback to the machine learning algorithms. In one example embodiment, this includes the option of tagging to attribute semantics to video and audio, and may, in some embodiments, be crowd-sourced. For example, meeting software 114, over a period of time, can tag "Tom" as being supportive to the meeting while "Rob" can be tagged as antagonistic for not agreeing on topic and "lashing out" to other meeting participants. Over a long period, meeting software 114 also uses machine learning algorithms to continuously train and learn about short term activities, new settings, meeting types and interactions.

Meeting software 114 takes an action based on the analysis of the analyzed and categorized interactions/state of the tagged individuals as depicted in step 206. For example, meeting software 114 can display the analyzed and categorized interactions/state of the tagged individuals on a screen presenting the unified meeting room with avatars that represent all of the meeting participants. In another example embodiment, meeting software 114 can present the meeting in a virtual reality environment, where participants could observe the scenes of the unified meeting room, or by using VR goggles. For example, Tom, a remote participant, would be able to see the engagement of persons in the room, if they are approving what is being said, for example by nodding, or if they are not paying attention. In this case, Tom could take actions to make sure that persons he needs engaged in a particular topic are engaged and reacting. Similarly, Jon and Rob in the meeting room would be aware of Tom's reaction and level of engagement.

Figure 3:
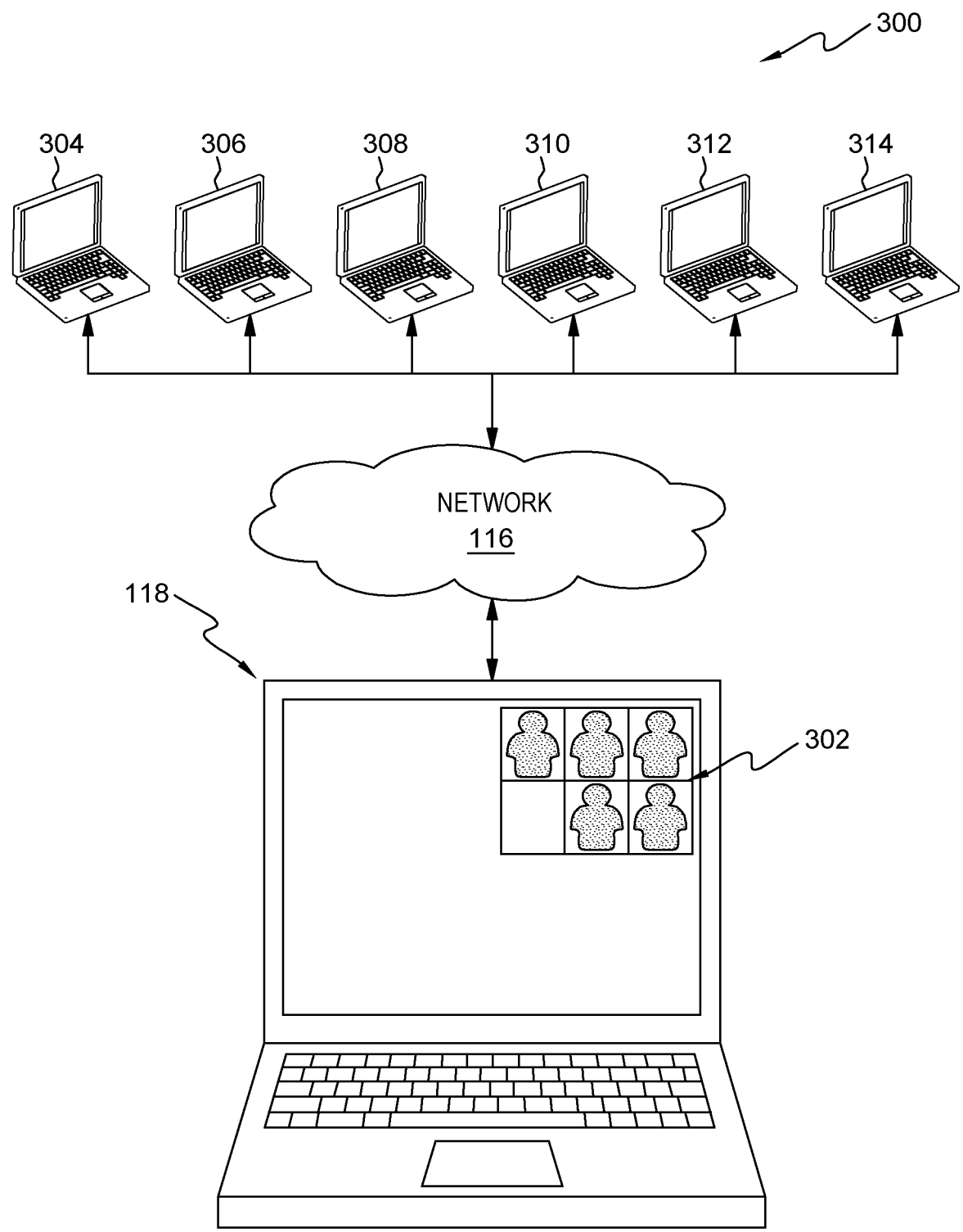
FIG. 3 is an illustration of a host computer displaying avatars resembling meeting participants of a meeting, in an embodiment in accordance with the present invention.

FIG. 3 is an illustration, generally designated 300, of a host computer displaying avatars resembling meeting participants of a meeting, in an embodiment in accordance with the present invention. FIG. 3 provides only an illustration of one implementation and does not imply any limitations with regard to the environments in which different embodiments may be implemented. Many modifications to the depicted environment may be made. In an example embodiment, a user of computer 118, also referred to as host computer 118, begins hosting an online meeting where attendees can join the meeting from one or more remote locations. In the example embodiment of FIG. 3, the user of computer 118 establishes a connection to meeting software 114, on server 102, via network 116. In the example embodiment of FIG. 3, server 102 is able to host online meetings with computers 304, 306, 308, 310, 312, 314 and other computing devices (not shown) of remote meeting environment 100. Additionally, in the example embodiment of FIG. 3, computer 304, 306, 308, 310, 312, and 314 are analogous to computer 118.

Upon joining the meeting, participants are displayed on meeting attendance panel 302 with avatars that resemble each user as depicted in FIG. 3. For example, a user of computer 304 joins the online meeting and an avatar that represents the user of computer 304 is displayed on meeting attendance panel 302. In one example embodiment, the user of computer 304 can previously create an avatar to resemble his/herself and store the generated avatar on computer 304. Upon joining an online meeting, an instance of meeting software on computer 304 can transmit the stored avatar to server 102 to be displayed on meeting attendance panel 302 of computer 118. In other example embodiments, meeting software 114 on server 102 can contain user profiles for a plurality of meeting participants. New users of meeting software 114 are prompted to set up a profile and create an avatar to be displayed during online meetings.

Figure 4A:
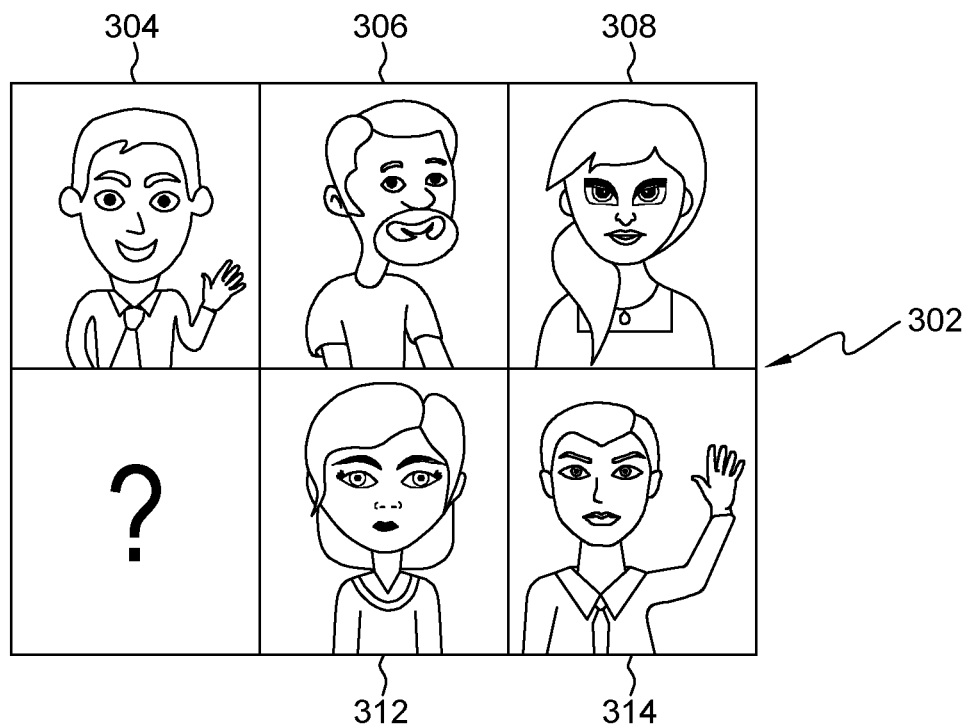
FIGS. 4A and 4B are illustrations of a meeting attendance panel displaying the avatars of the meeting participants on the host computer, in an embodiment in accordance with the present invention.
Figure 4B:
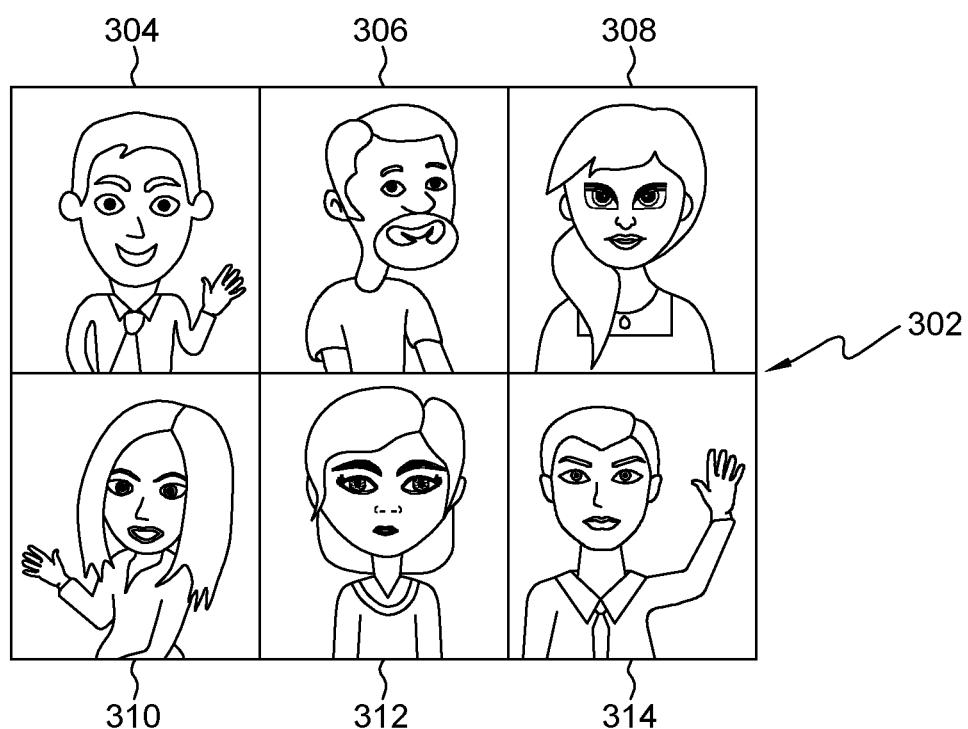
Figure 5:
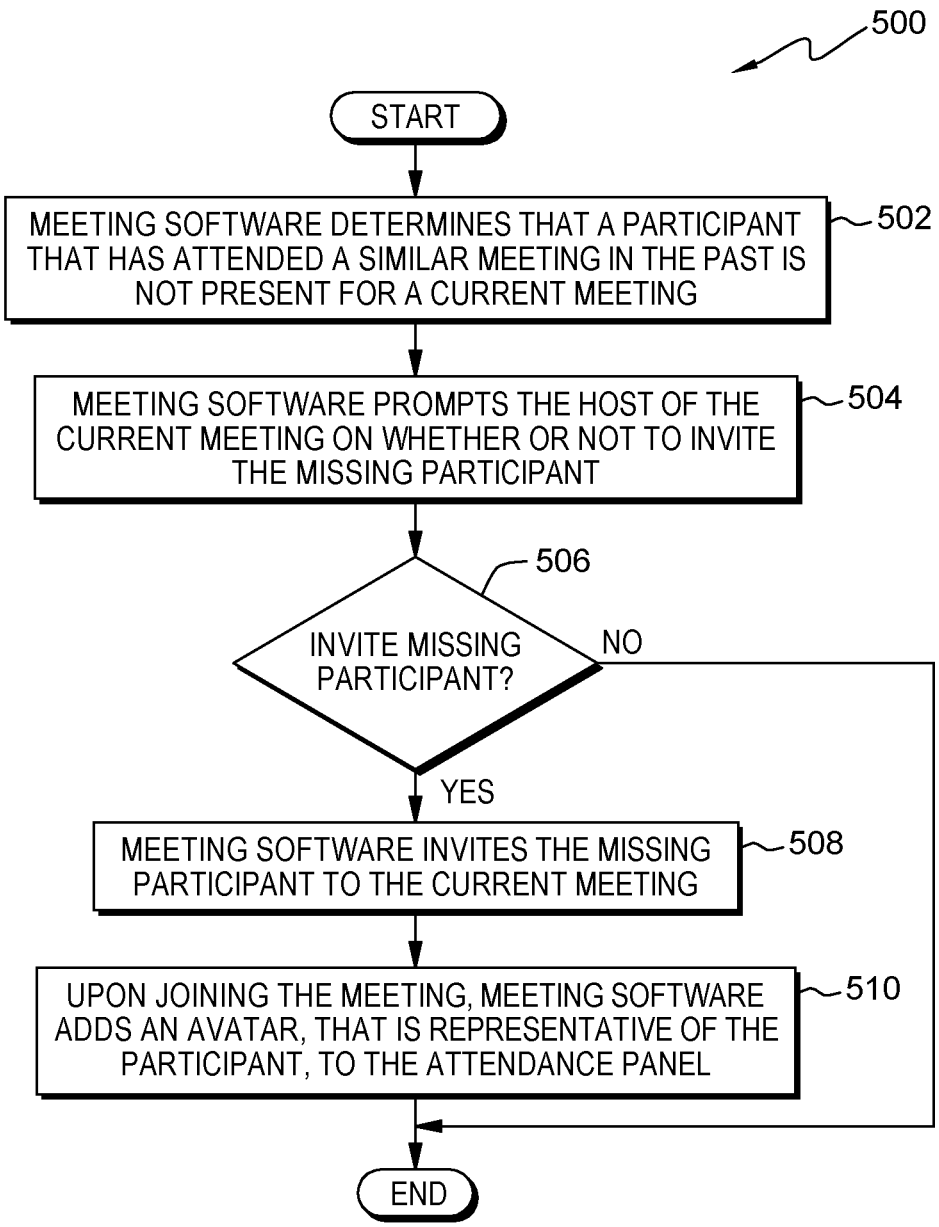
FIG. 5 is a flowchart depicting operational steps of a meeting software, on a server within the remote meeting environment of FIG. 1, for determining, and inviting, missing meeting participants, in an embodiment in accordance with the present invention.

FIGS. 4A and 4B are illustrations of a meeting attendance panel displaying the avatars of the meeting participants on the host computer, in an embodiment in accordance with the present invention. FIG. 5 is a flowchart, generally designated 500, depicting operational steps of a meeting software, on a server within the remote meeting environment of FIG. 1, for determining, and inviting, missing meeting participants, in an embodiment in accordance with the present invention. FIGS. 4A through 5 will now be discussed over the course of the following paragraphs.

Continuing with the example embodiment of FIG. 3, users of computers 304, 306, 308, 312, and 314 join the online meeting hosted by the user of computer 118 as depicted by the meeting attendance panel 302 displayed on the user interface of computer 118 and in FIG. 4A.

Meeting software 114 determines that a participant that has attended a similar meeting in the past is not present for a current meeting as depicted in step 502. For example, meeting software determines that the current meeting takes place once a week by analyzing the tags (e.g., metadata information) of a plurality of past meetings. Upon examining participant attendance of past meetings (e.g., the past ten meetings), meeting software 114 detects that user of computer 310 is not present for the current meeting and indicates the absence of user of computer 310 with a question mark on meeting attendance panel 302 as depicted in FIG. 4A. In another example embodiment, meeting software 114 can determine the missing participant by comparing the current participants to the list of required or optional meeting attendees.

In step 504, meeting software 114 prompts the host of the current meeting on whether or not to invite the missing participant. For example, meeting software 114 prompts the host (user of computer 118), using speech, or with a dialogue box displayed in the user interface of computer 118, on whether to invite user of computer 310 to the current meeting. In another example embodiment, meeting software 114 can prompt one or more of the meeting participants on whether to invite user of computer 310 to the current meeting. In other example embodiments, a user of meeting software 114, who is setting up a meeting, can define one or more delegates to serve as hosts of the meeting. For example, if meeting software asks or prompts a question to invite another participant to the meeting, any of the one or more delegates can answer.

In decision step 506, meeting software 114 determines if the missing participant should be invited. For example, meeting software 114 receive an answer from the host via the audio stream, or the host clicks "Yes" on the dialogue box displayed on user interface 130. In another example embodiment, meeting software 114 can detect the facial expressions (e.g., interpret the mouth movement), of the user of computer 118.

If meeting software 114 determines that the missing participant should be invited ("Yes" branch, decision step 506), meeting software 114 invites the missing participant to the current meeting as depicted in step 508. For example, meeting software 114 can establish a call to computer 310 over a data connection on network 116. The user of computer 310 can then accept the call or decline the call. If the user of computer 310 accepts the call, meeting software 114 can request to activate the camera and microphone of computer 310 and add an avatar resembling the user of computer 310 to meeting attendance panel 302 as depicted in FIG. 4B, and depicted in step 510.

If meeting software 114 determines that the missing participant should not be invited ("No" branch, decision step 506), meeting software 114 skips steps 508 and 510 as depicted in FIG. 5. For example, if the answer is "No", meeting software 114 can schedule one or more future meetings based on received inputs from the host or other meeting participants. For example, the user of computer 118 can say "Yes, schedule a meeting for tomorrow at 1:00 PM with all of us". However, the user of computer 312 interjects and says, "I have a meeting at 1:00, so I can't make it." Upon receiving the voice inputs from the user of computer 118 and the user of computer 312, meeting software 114 can schedule a meeting for the next day at 1:00 PM with the users of computers 118, 304, 306, 308, 310, and 314.

Upon joining the meeting, meeting software 114 adds an avatar, that is representative of the participant, on meeting attendance panel 302 as depicted in step 510. For example, meeting software 114 can display the avatar of user of computer 310, stored on server 102, on meeting attendance panel 302 on user interface 130 of computer 118 as depicted in FIG. 4B. In other example embodiments, the avatars resembling the users may be stored on the respective computing device of the user. For example, upon joining the meeting, an instance of meeting software 114, executing on computer 310, can display an avatar, that is representative of the participant, on meeting attendance panel 302.

Figure 6A:
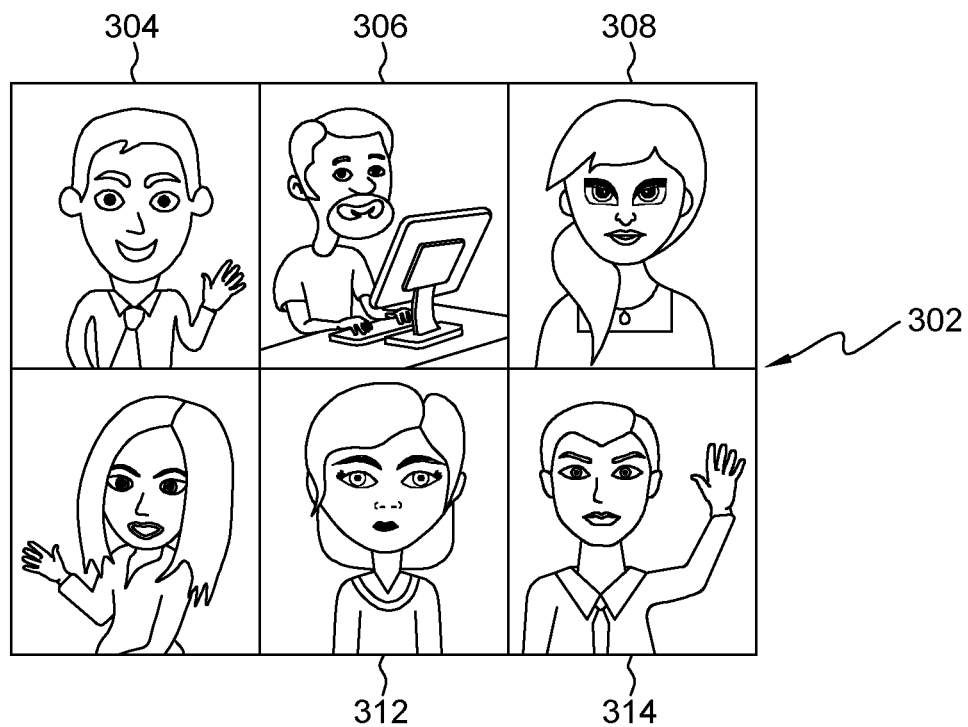
FIGS. 6A through 6C are illustrations of a meeting software recognizing emotional, dispositional, and attentional states of meeting participants, in an embodiment in accordance with the present invention.
Figure 6B:
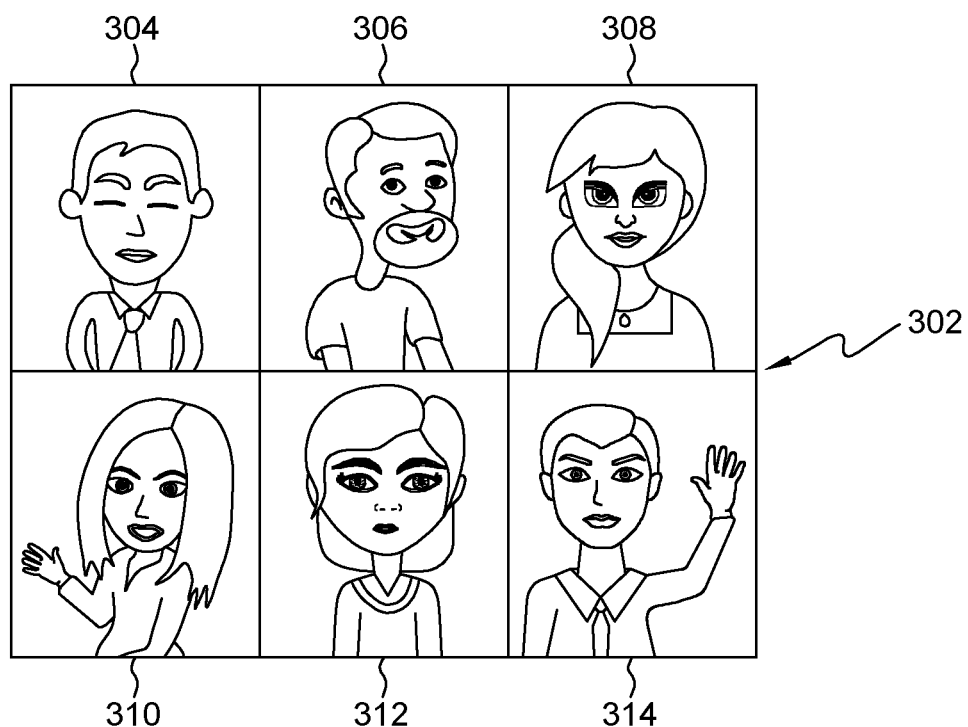
Figure 6C:
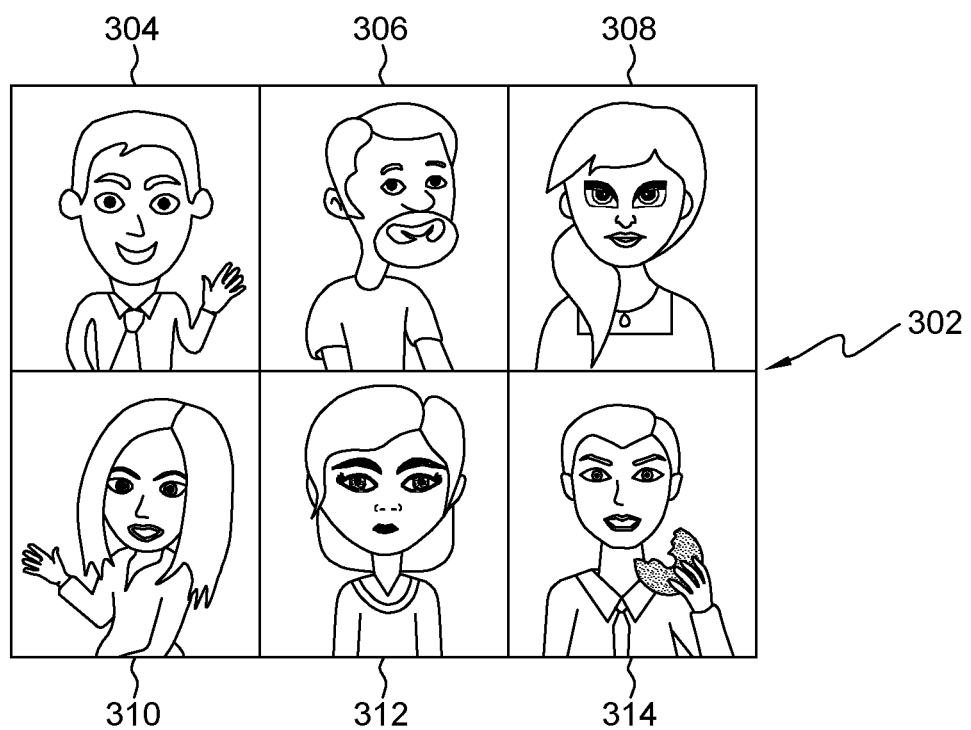
Figure 7:
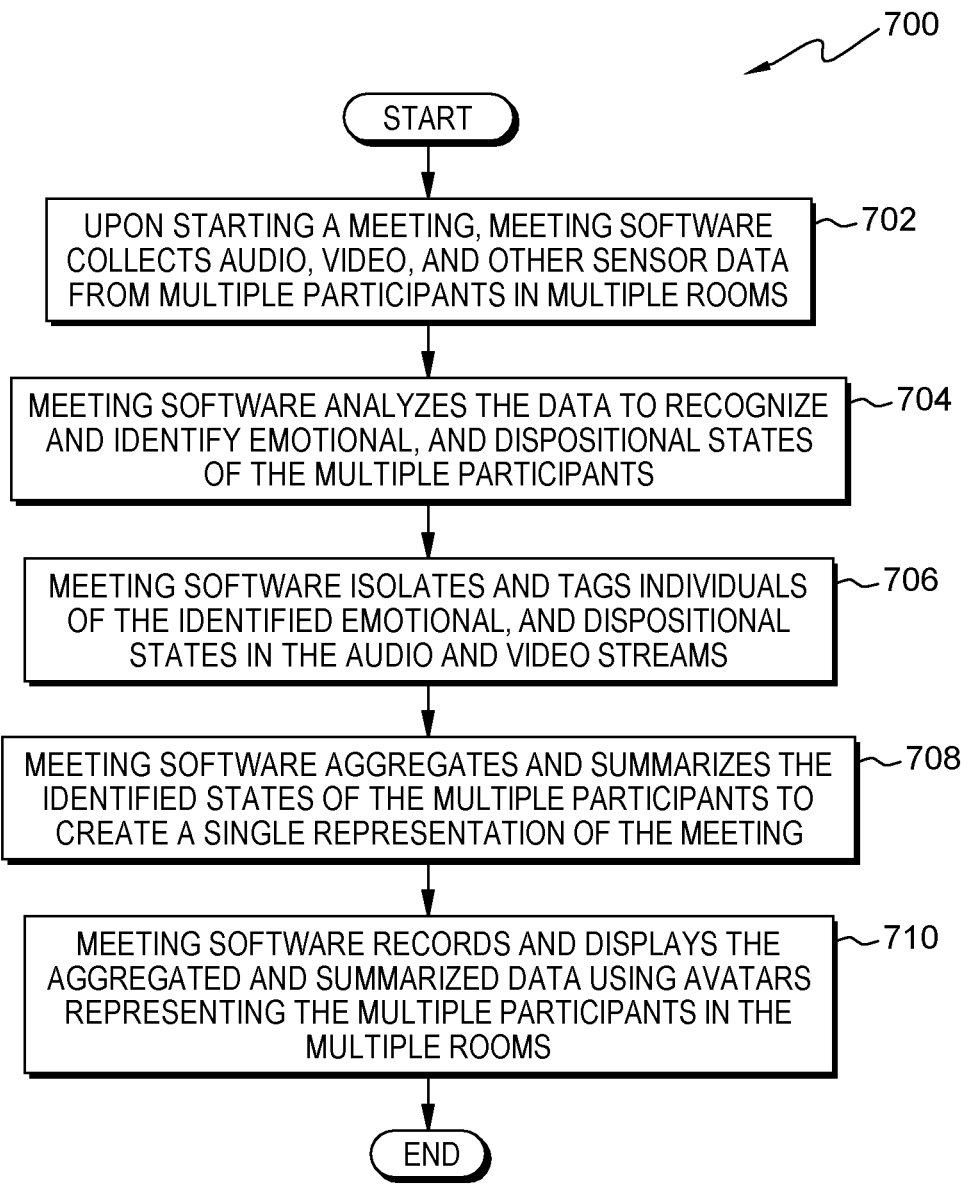
FIG. 7 is a flowchart depicting operational steps of a meeting software, on a server within the remote meeting environment of FIG. 1, for describing a machine learning process of recognizing a plurality of emotional, dispositional, and attentional states, in an embodiment in accordance with the present invention.

FIGS. 6A through 6C are illustrations of a meeting software recognizing emotional, dispositional, and attentional states of meeting participants, in an embodiment in accordance with the present invention. FIG. 7 is a flowchart, generally designated 700, depicting operational steps of meeting software 114, on a server within the remote meeting environment of FIG. 1, for describing a machine learning process of recognizing a plurality of emotional, dispositional, and attentional states, in an embodiment in accordance with the present invention. FIGS. 6A through 7 will now be discussed over the course of the following paragraphs.

Continuing with the previous example embodiment of FIG. 5, the host, on computer 118, is conducting an online meeting with users of computers 304, 306, 308, 310, 312, and 314. Upon starting the meeting, meeting software 114 collects audio, video, and other sensor data from multiple participants in multiple rooms as depicted in step 702. For example, meeting software 114 can gather data from one or more integrated cameras and microphones of computers 304, 306, 308, 310, 312, and 314. In another example embodiment, meeting software 114 can gather data from one or more cameras and microphones in a room that one or more meeting participants are located in. For example, if the users of computer 312 and 314 are sharing a conference room, meeting software can gather data from one or more cameras viewing the conference room and data from a speaker phone in the vicinity of the users of computers 312 and 314. In another example embodiment, meeting software 114 can determine the pulse rate (e.g., heart rate), of a meeting participant by gathering data from a BLUETOOTH enabled device worn by the user. (Note: the term "BLUETOOTH" may be subject to trademark rights in various jurisdictions throughout the world and is used here only in reference to the products or services properly denominated by the mark to the extent that such trademark rights may exist.) For example, meeting software 114 can gather data from a BLUETOOTH enabled heart rate monitor, such as a fitness device, worn by a user, wherein meeting software can determine a pulse rate of the user at a specific moment in the audio and video stream. In yet another example embodiment, meeting software 114 can detect emotional states of meeting participants by monitoring Infrared (IR) body heat patterns of one or more meeting participants during the online meeting. For example, meeting software 114 can use one or more cameras (e.g., such as camera 126, or cameras located in the same space as the one or more meeting participants), to detect one or more emotional states of the one or more meeting participants. Examples of detectable emotional states include, but not limited to, the following: anger, fear, disgust, happiness, sadness, feeling neutral, anxious, love, depression, contempt, pride, shame, and envy.

In step 704, meeting software 114 analyzes the data to recognize and identify emotional, and dispositional states of the multiple participants. For example, meeting software 114 analyzes data of the one or more meeting participants using the audio and video streams, one or more BLUETOOTH enabled devices, such as fitness devices, and one or more IR cameras (not shown). In analyzing the audio streams of the meeting participants, meeting software 114 can recognize and identify the pitch and tone of a meeting participant objecting to a comment spoken by another participant. At the same time, in analyzing the video streams of the meeting participants, meeting software 114 can recognize and identify movement, and gestures of the same meeting participant that objects to the comment spoken by another participant. Additionally, for the same meeting participant, meeting software 114 can recognize an increase in the heart rate of the meeting participant that objects to the comment spoken by another participant. Furthermore, in analyzing the IR data, meeting software 114 can recognize and identify the body heat of the same meeting participant that objects to the comment spoken by another participant, and identify that meeting participant as being angry.

Meeting software 114 isolates and tags individuals of the identified emotional, and dispositional states in the audio and video streams as depicted in step 706. For example, meeting software 114 can tag the analyzed data to identify the particular individual at certain periods of time during the online meeting. For example, during the online meeting, the user of computer 306 becomes distracted by work and begins typing on a keyboard and not contributing to the discussion as depicted in FIG. 6A. Meeting software 114 identifies the sound of the keyboard from that audio stream data from computer 306. Additionally, meeting software 114 identifies the hand movements and gestures of the user of computer 306 with the hand movements and gestures used in typing on a computer keyboard. Furthermore, meeting software 114 identifies the body heat pattern, or signature of the user of computer 306, as neutral and not the same as the other meeting participants who are actively participating in the online meeting. Meeting software 114 then tags the audio, video, and IR data streams at that moment in time to identify user of computer 306 as typing and not contributing to the meeting.

In another example embodiment, the user of computer 304 begins to participate less frequently and eventually begins to fall asleep as depicted in FIG. 6B. In analyzing the audio stream data of the online meeting, meeting software 114 determines that the participation level (e.g., the number of times the user of computer 304 speaks), has become less frequent over a period of time. Additionally, in analyzing the video stream data from the online meeting, meeting software 114 detects that the head of the user of computer 304 is bobbing periodically and the user's eyes are closed. In addition to analyzing the audio and video data, meeting software 114 analyzes data from a BLUETOOTH enabled fitness device worn by the user of computer 304 and determines that the heart rate of the user of computer 304 is 42 beats per minute, which is the same heart rate measured for the user of computer 304 during sleep periods. Meeting software 114 then tags the audio, video, and BLUETOOTH fitness device data streams at that moment in time to identify user of computer 304 as sleeping and not contributing to the meeting.

In yet another example embodiment, the user of computer 314 is eating during the online meeting as depicted in FIG. 6C. In analyzing the audio stream data of the online meeting, meeting software 114 determines that the participation level (e.g., the number of times the user of computer 314 speaks), has become less frequent over a period of time and/or speaks with food in his mouth. Additionally, in analyzing the video stream data from the online meeting, meeting software 114 detects that the user of computer 304 is periodically lifting his hand to place food in his mouth. Meeting software 114 also determines that the user of computer 314's mouth is moving in a way that is associated with chewing. Furthermore, meeting software 114 identifies the body heat pattern, or signature of the user of computer 314 as content and not the same as the other meeting participants who are actively participating in the online meeting. In addition to analyzing the audio, video and IR data, meeting software 114 analyzes data from a BLUETOOTH enabled fitness device worn by the user of computer 314 and determines that the heart rate of the user of computer 304 has increased since the user has started eating. Meeting software 114 then tags the audio, video, IR, and BLUETOOTH fitness device data streams at that moment in time to identify user of computer 314 as eating and not contributing to the meeting.

In step 708, meeting software aggregates and summarizes the identified states of the multiple participants to create a single representation of the meeting. For example, meeting software 114 creates a time synchronous stream of outputs that can be used as input or feedback to one or more machine learning algorithms, and to also be used for a later playback of the meeting. In one example embodiment, the aggregated data streams (i.e., a single representation), can show speaker dominance, patterns of eye gaze between co-located participants, participant engagement (e.g., user of computer 304 falling asleep, the user of computer 306 multi-tasking, or the user of computer 314 eating), provide information such as individual focus of attention to help someone on a phone realize what is happening in the room (e.g., so they can see that the facilitator is still concentrating on organizing paperwork, or attending to an urgent call and is not just being silent). The unified representation is a knowledge graph constituting nodes, attributes, and relationships that provides a summary of the important aspects of the participants and their interactions. The nodes include each participant, physical objects in the room, topics, activities/tasks being performed, and so on. The attributes include level of attention, degree of multi-tasking, and so on. Relationships include elements such as disposition of one participant toward another and the relationship between the participants and the topics. There are also attributes on these relationships, such as the level of position disposition and negative disposition. Each value of an attribute in the knowledge graph and the nodes and relationships themselves associated with the history of the streams that contributed to the summary data in the attribute.

Meeting software 114 records and displays the aggregated and summarized data using avatars representing the multiple participants in the multiple rooms as depicted in step 710. For example, meeting software 114 can display the aggregated and summarized identified states of the multiple online participants as a single representation of the online meeting on meeting attendance panel 302 as depicted in FIGS. 3 and 6A through 6B. For example, referring again to FIG. 6A, meeting software 114 displays the customized avatars of each meeting participant, wherein the avatars convey the identified state of each meeting participant. The user of computer 118 can see the see the engagement of each meeting participant in the physical space of each meeting participant. For example, the user of computer 118 can see if the meeting participants are approving what is being said for example by nodding, or if the meeting participants are simply not paying attention. In the example embodiment of FIG. 6A, the user of computer 118 can see that the user of computer 314 is focused on typing and not contributing to the meeting.

In the example embodiment of FIG. 6B, meeting software 114 displays the aggregated and summarized state of the user of computer 304, on meeting attendance panel 302, using the customized avatar representing the user of computer 304 in a sleeping state. In another example embodiment, where the user of computer 304 is sharing a physical space (e.g., conference room) with another meeting participant (e.g., user of computer 312), the avatar of the user of computer 312 may convey a distracted state since the user of computer 312 may be frequently looking at the user of computer 304 who is sleeping during the meeting.

Referring again to FIG. 6C, meeting software 114 displays the recognized interplay, exchange, between participants using a collection of machine learning algorithms, wherein the collection of machine learning algorithms captures the different levels of human interaction such as touch, gaze, speech, reference, gesture, reaction, etc. In the example embodiment of FIG. 6C, meeting software 114 identifies the user of computer 314 eating food and not contributing to the discussion. In other example embodiments, the collection of machine learning algorithms monitors the flow of the experience of the meeting participants, and have the system adapt around optimizing, stabilizing, minimizing, maximizing human interaction. For example, meeting software 114 can determine that the user of computer 308 is typically more withdrawn and does not speak up during meetings. Meeting software 114 can then automatically prompt the user of computer 308 via speech, or with a pop up dialogue on a screen for the user of computer 308 to answer, where the user of computer 308 is asked to contribute to the discussion. In another example embodiment, meeting software 114 can notify the host (e.g., the user of computer 118), via speech, or with a pop up dialogue on a screen for the user of computer 118 to see, to ask the user of computer 308 for an opinion on the topic. In terms of optimizing the human interaction, the desired level of human interaction in a meeting varies according to topic and meeting. Therefore, a human participant may set certain levels for certain types of meetings. If there is no human participant, the system can be set to improve the level of human interaction. Instead of one metric, a system can be configured to use various metrics such as amount of speaking. A system can be set up with a number of different categories for each metric such as speaking little, average, or a lot. These values are present as attributes in the knowledge graph unified representation and can also be reflected on the avatar. Data is collected with an update cycle of, for example, 10 seconds. Different metrics may have different configurable update cycles. At the end of the update cycle, features are computed and added to the knowledge graph and used for running a model. While some values are private, others may be shared and displayed.

The machine learning model can be a regression model, or in the case of categories of values for metrics, a logistic regression model. The model can be trained on features extracted from the audio/video streams that are stored in the knowledge graph. Spatial and temporal features can be used for the regression. For example, the speaking amount may be extracted from the audio stream over time. Degree of attention may be extracted from audio and video streams over time (attending a lot) and space (standing up and sitting down, moving around).

Training data may be collected from meetings very similar a target meeting. For example, the features extracted should be measurable in both meetings. If the data is not available then defaults can be set and the model can still be trained, but the model will be less useful. In addition, the number of participants in the meetings should be similar. Models may be developed for two-person meetings, three to five person meetings, and five person and above meetings. For example, the desired type of meeting may be selected and optimal values of metrics assigned and then based upon the differences between the optimal values and the values asserted by the model, various interventions can be expected, such as signaling privately to individuals to "calm down" or suggesting a side meeting between two participants.

Figure 8A:
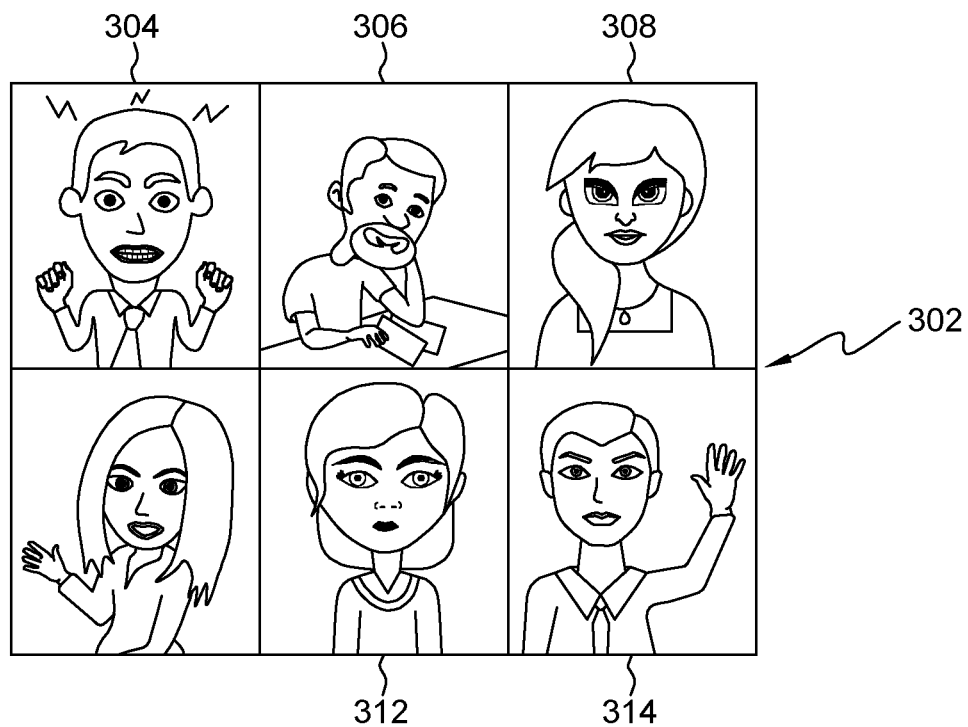
FIGS. 8A and 8B are illustrations of a meeting software identifying two meeting participants that are not agreeing on a topic and scheduling a side meeting, in an embodiment in accordance with the present invention.
Figure 8B:
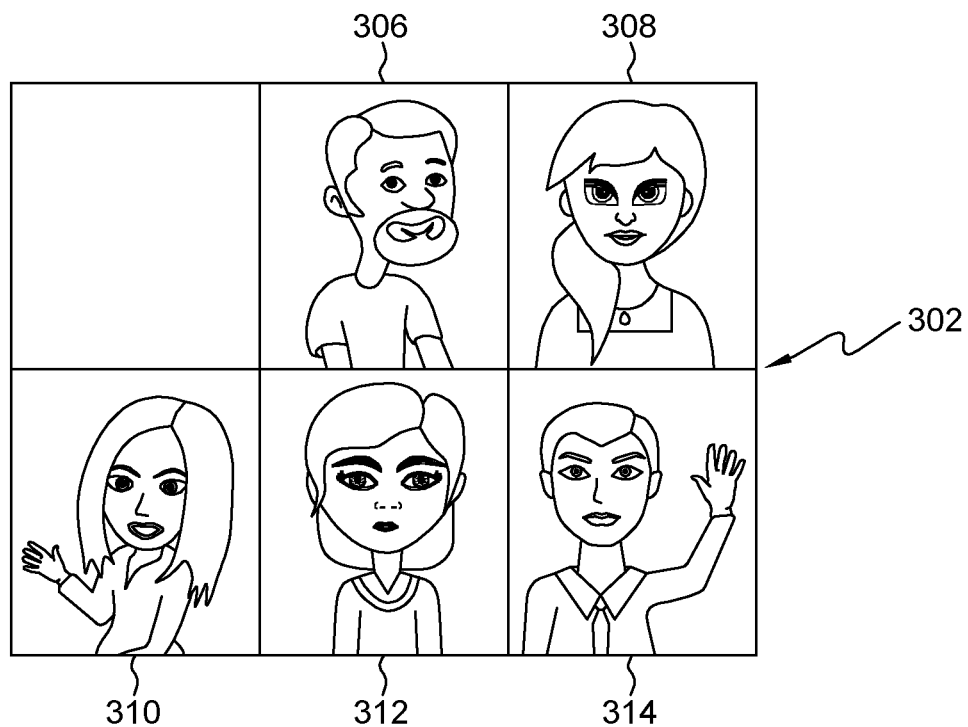
Figure 9:
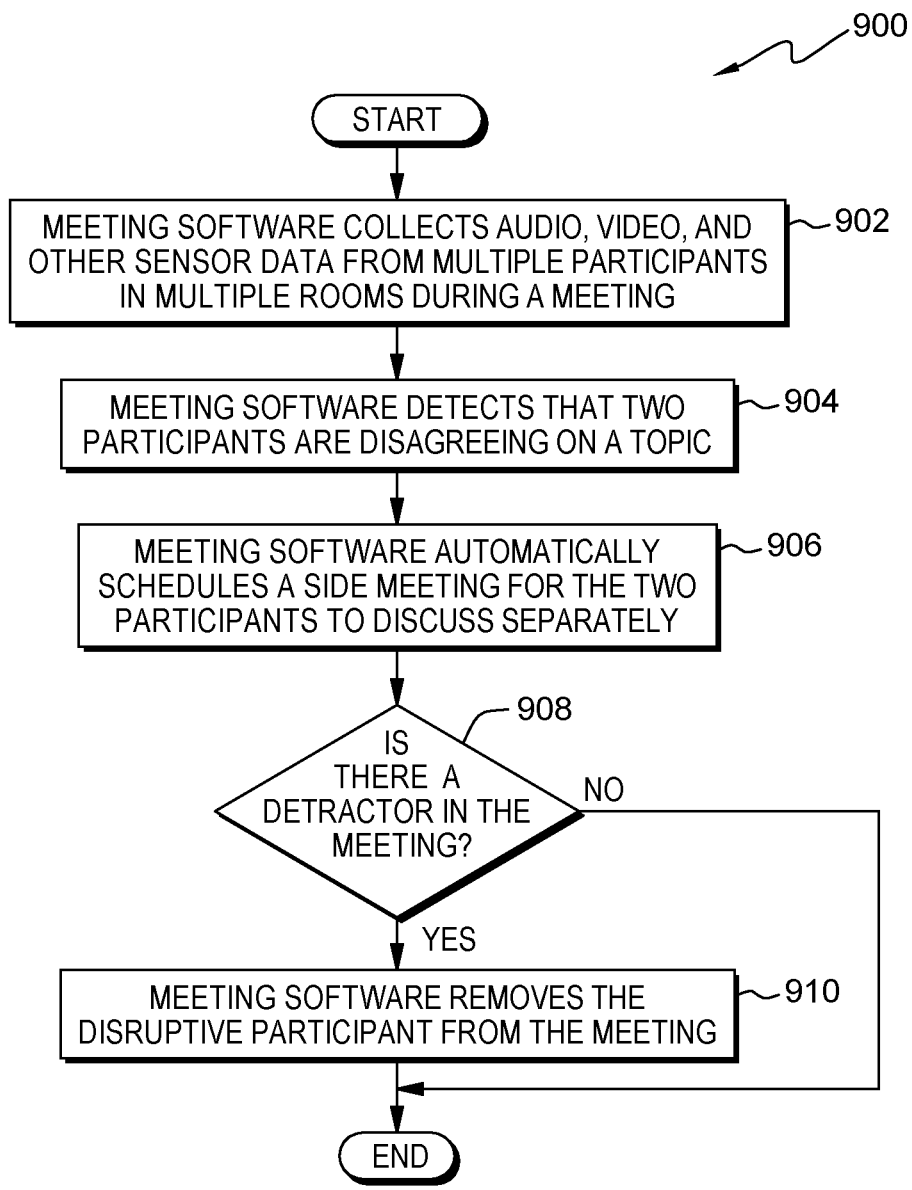
FIG. 9 is a flowchart depicting operational steps of a meeting software, on a server within the remote meeting environment of FIG. 1, of a meeting software identifying two meeting participants that are not agreeing on a topic and scheduling a side meeting and removing a detractor of the current meeting, in an embodiment in accordance with the present invention.

FIGS. 8A and 8B are illustrations of a meeting software identifying two meeting participants that are not agreeing on a topic and scheduling a side meeting, in an embodiment in accordance with the present invention. FIG. 9 is a flowchart, generally designated 900, depicting operational steps of a meeting software, on a server within the remote meeting environment of FIG. 1, identifying two meeting participants that are not agreeing on a topic and scheduling a side meeting and removing a detractor of the current meeting, in an embodiment in accordance with the present invention. FIGS. 8A through 9 will now be discussed over the course of the following paragraphs.

Continuing with the previous example embodiment of FIG. 7, the host, on computer 118, is conducting an online meeting with users of computers 304, 306, 308, 310, 312, and 314. Meeting software 114 collects audio, video, and other sensor data from multiple participants in multiple rooms during a meeting as depicted in step 902. For example, meeting software 114 analyzes data of the one or more meeting participants using the audio and video streams, one or more BLUETOOTH enabled devices, such as fitness devices, and one or more IR cameras (not shown).

In step 904, meeting software detects that two participants are disagreeing on a topic. For example, in analyzing the audio streams of the meeting participants, meeting software 114 can recognize and identify the pitch and tone of a meeting participant objecting to a comment spoken by another participant. For example, meeting software 114 can determine if one of the meeting participants is becoming a detractor to the progress in the online meeting as depicted in FIG. 8A. For example, in analyzing the audio stream data of the online meeting, meeting software 114 determines that the participation level (e.g., the number of times the user of computer 304 speaks) has become more frequent over a period of time, and repeatedly directs comments to the user of computer 306. Furthermore, the user of computer 304's pitch has increased and the tone is angry. Additionally, in analyzing the video stream data from the online meeting, meeting software 114 detects that the user of computer 304 is periodically lifting his hands with clenched fists. Meeting software 114 also determines that the user of computer 304's mouth and facial expressions are associated with anger. Furthermore, meeting software 114 identifies the body heat pattern, or signature of the user of computer 304 as being angry. In addition to analyzing the audio, video and IR data, meeting software 114 analyzes data from a BLUETOOTH enabled fitness device worn by the user of computer 304 and determines that the heart rate of the user of computer 304 has increased since the user has started eating. Meeting software 114 then tags the audio, video, IR, and BLUETOOTH fitness device data streams at that moment in time to identify user of computer 304 as disagreeing with the user of computer 306.

Meeting software 114 automatically schedules a side meeting for the two participants to discuss separately as depicted in step 906. For example, meeting software 114 accesses the calendars for the user of computer 304 and the user of computer 306 and determines a future date and time where the issue can be further discussed to prevent the current meeting from progressing. Meeting software 114 then automatically schedules a meeting between the user of computer 304 and the user of computer 306 on the future date and time to discuss the issue. In another example embodiment, meeting software 114 can prompt the host (e.g., user of computer 118), via speech, or with a pop up dialogue on a screen for the host to answer, on whether to schedule the future meeting between the user of computer 304 and the user of computer 306. The host can then manually click on the pop up dialogue to schedule the meeting. In another example embodiment, meeting software 114 can schedule one or more future meetings based on user profile settings for a plurality of meeting participants, wherein the user profile settings are stored on server 102 and can define how meetings can be scheduled. For example, a user may only want to schedule meetings manually and therefore not allow meeting software 114 to access his/her calendar. In another example embodiment, a user would prefer to be asked by meeting software 114 to allow access to his/her calendar prior to scheduling the meeting.

In decision step 908, meeting software 114 determines if there is a detractor in the meeting. If meeting software 114 determines that there is a detractor in the meeting ("Yes" branch, decision step 908), meeting software 114 removes the disruptive participant from the meeting as depicted in step 910. For example, upon scheduling a future meeting between the user of computer 304 and the user of computer 306, meeting software 114 continues to detect anger from the user of computer 304 and that the user of computer 304 is affecting the progress of the meeting. Meeting software 114 can then automatically remove the user of computer 304 from the meeting as depicted in FIG. 8B. In other example embodiments, meeting software 114 may prompt the host (e.g., user of computer 118), via speech, or with a pop up dialogue on a screen for the host to answer, on whether to remove the user of computer 304 from the current meeting. The host can then manually click on the pop up dialogue to remove the user of computer 304 from the current meeting. If meeting software 114 determines that there is not a detractor in the meeting ("No" branch, decision step 908), meeting software 114 skips step 910 as depicted in FIG. 9. In another example embodiment, if there are a small number of viewpoints (e.g., pros and cons) then only the meeting participants involved in the dispute (as measured by interaction intensity/duration/frequency) can be invited to a smaller meeting to "hash out" the differences in viewpoints. More generally, upon detecting a lack of consensus on one or more topics, meeting software 114 can schedule a follow-up meeting involving a subset of the original participants.

In an alternate example embodiment, the present invention can be used to compute the flow of human-to-human interactions between pairs of one or more persons, then suggest possible work partners with whom the one or more persons have NOT interacted with during the meeting. These could also be people that are open to interacting but have not done so potentially because they are distracted by a smartphone during the meeting.

In another alternate example embodiment, the present invention can leverage analyzed data to improve social networking. For example, the user of computer 312 can measure, over a period of time, if the user of computer 312 and the user of computer 314 attend more meetings together, wrote patents and papers together, "friended" one another on social networks, or ended up in the same department at work. This type of system could be used at work parties and in-person social networking events, for example.

In another alternate example embodiment, meeting attendance panel 302 can be replaced with an additional visualization using a petri dish with colored dots representing each meeting participant. As a meeting participant becomes more engaged in the discussion, the colored dot representing the meeting participant migrates more toward the center of the petri dish in proportion to how open and engaged they appear to be with respect to the given person who is speaking.

Figure 10:
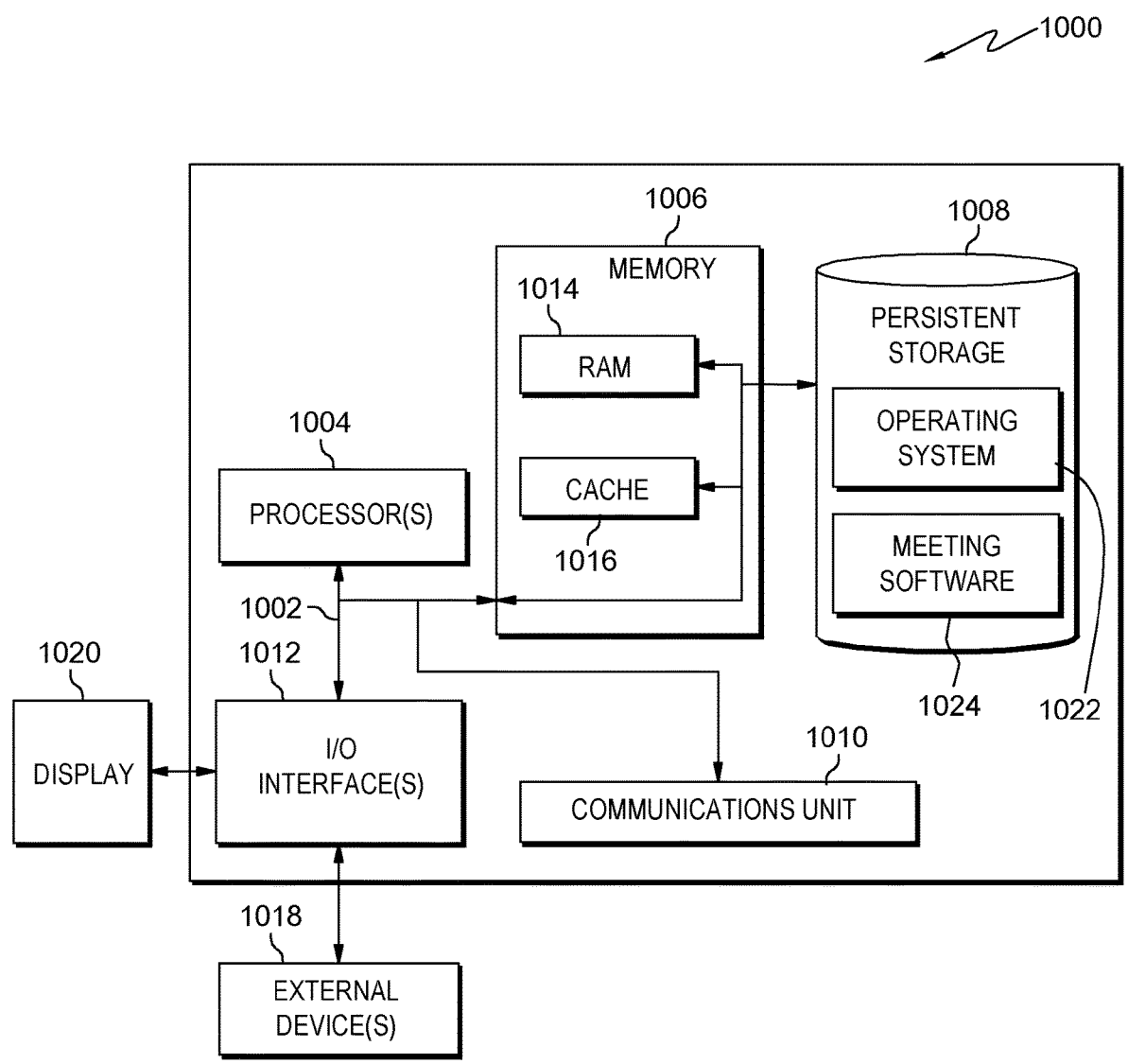
FIG. 10 depicts a block diagram of components of the server computer executing the meeting software, in an embodiment in accordance with the present invention.

FIG. 10 depicts a block diagram, generally designated 1000, of components of the server computer executing the meeting software, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Server computer 1000 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Operating system 1022 and meeting software 1024 are stored in persistent storage 1008 for execution by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of network 116 and computer 118, 304, 306, 308, 310, 312, and 314. In these examples, communications unit 1010 includes one or more network interface cards. Communications unit 1010 may provide communications through the use of either or both physical and wireless communications links. Operating system 1022 and meeting software 1024 may be downloaded to persistent storage 1008 through communications unit 1010.

I/O interface(s) 1012 allows for input and output of data with other devices that may be connected to server computer 1000. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., operating system 1022 and meeting software 1024, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at least more than one item; there must exist at least two items, but there can also be three, four, or more items.

"Includes" and any variants (e.g., including, include, etc.) means, unless explicitly noted otherwise, "includes, but is not necessarily limited to."

A "user" includes, but is not necessarily limited to: (I) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

A "module" is any set of hardware, firmware, and/or software that operatively works to do a function, without regard to whether the module is: (I) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones; personal digital assistants (PDAs); body-mounted or inserted computers; embedded device style computers; and/or application-specific integrated circuit (ASIC) based devices.

What is claimed is:

1. A computer-implemented method comprising:
   capturing, by one or more computer processors, interpersonal interactions between people in a physical space during a period of time, using machine learning algorithms to detect the interpersonal interactions and a state of each person based on visual and audio sensors in the physical space;
   analyzing and categorizing, by one or more computer processors, the interactions and state of each person, and tagging representations of each person with respectively analyzed and categorized interactions and states for the respective person over the period of time;
   determining, by one or more computer processors, levels of engagement for each person with respect to a speaker based, at least in part, on the respectively analyzed and categorized interactions and states for the respective person; and
   displaying, by one or more computer processors, the representations of each person on a screen, wherein the representations migrate toward the center of the screen in proportion to the determined levels of engagement for each person with respect to the speaker.

2. The computer-implemented method of claim 1, wherein capturing interpersonal interactions between people in a physical space during a period of time comprises:
   collecting, by one or more processors, data from a plurality of computing devices, wherein the plurality of computing devices includes a camera, a microphone, a heartrate monitor, and an infra-red camera.

3. The computer-implemented method of claim 1, wherein detecting the interpersonal interactions and state of each person comprises:
   determining, by one or more computer processors, using the machine learning algorithms, one or more states of a meeting participant, wherein the one or more states of the meeting participant are selected from the group consisting of:
   an eye movement, a gaze, or pupil dilation,
   a pulse rate,
   an infra-red body heat pattern, and
   a group interaction.

4. The computer-implemented method of claim 1, wherein analyzing and categorizing the interactions and state of each person, and tagging representations of each person with the respectively analyzed and categorized interactions and states of the respective person over the period of time comprises:
   learning, by one or more computer processors, interactions and behaviors of each person over the period of time and tagging representations of each person with data collected from a plurality of computing devices.

5. The computer-implemented method of claim 4, wherein tagging representations of each person with data from a plurality of computing devices comprises:
   identifying and isolating, by one or more computer processors, each person in a physical space using the data from the plurality of computing devices.

6. The computer-implemented method of claim 1, wherein displaying, by one or more computer processors, the representations of each person on a screen further comprises:
   displaying, by one or more computer processors, on the screen, a unified meeting room with avatars that represent each person as a participant in a meeting, and wherein the computer-implemented method further comprises:
   determining, by one or more computer processors, using the machine learning algorithms, that a meeting participant is not paying attention to the meeting, based on the respectively analyzed and categorized interactions and states of the meeting participant; and
   indicating, by one or more computer processors, to a meeting host, that the meeting participant that is not paying attention using an avatar that represents the meeting participant.

7. The computer-implemented method of claim 6, further comprising:
   upon detecting, using the machine learning algorithms, a lack of consensus on one or more topics, automatically scheduling, by one or more computer processors, a follow-up meeting involving a subset of the original meeting participants; and
   upon detecting, using the machine learning algorithms, a disruptive meeting participant in the meeting, automatically removing, by one or more computer processors, the disruptive meeting participant from the meeting.

8. A computer program product comprising:
   one or more computer readable storage media and program instructions stored on the one or more computer readable storage media, wherein the one or more computer readable storage media are not transitory signals per se, the stored program instructions comprising:
   program instructions to capture interpersonal interactions between people in a physical space during a period of time, using machine learning algorithms to detect the interpersonal interactions and a state of each person based on visual and audio sensors in the physical space;
   program instructions to analyze and categorize the interactions and state of each person, and tag representations of each person with respectively analyzed and categorized interactions and states for the respective person over the period of time;
   program instructions to determine levels of engagement for each person with respect to a speaker based, at least in part, on the respectively analyzed and categorized interactions and states for the respective person; and
   program instructions to display the representations of each person on a screen, wherein the representations migrate toward the center of the screen in proportion to the determined levels of engagement for each person with respect to the speaker.

9. The computer program product of claim 8, wherein the program instructions to capture interpersonal interactions between people in a physical space during a period of time comprise:
program instructions to collect data from a plurality of computing devices, wherein the plurality of computing devices includes a camera, a microphone, a heartrate monitor, and an infra-red camera.

10. The computer program product of claim 8, wherein the program instructions to detect the interpersonal interactions and state of each person comprise:
program instructions to determine, using the machine learning algorithms, one or more states of a meeting participant, wherein the one or more states of the meeting participant are selected from the group consisting of:
an eye movement, a gaze, or pupil dilation,
a pulse rate,
an infra-red body heat pattern, and
a group interaction.

11. The computer program product of claim 8, wherein the program instructions to analyze and categorize the interactions and state of each person, and tag representations of each person with the respectively analyzed and categorized interactions and states of the respective person over the period of time comprise:
program instructions to learn interactions and behaviors of each person over the period of time and tag representations of each person with data collected from a plurality of computing devices.

12. The computer program product of claim 11, wherein the program instructions to tag representations of each person with data from a plurality of computing devices comprise:
program instructions to identify and isolate each person in a physical space using the data from the plurality of computing devices.

13. The computer program product of claim 8, wherein the program instructions to display the representations of each person on a screen further comprise:
program instructions to display, on the screen, a unified meeting room with avatars that represent each person as a participant in a meeting, and wherein the stored program instructions further comprise:
program instructions to determine, using the machine learning algorithms, that a meeting participant is not paying attention to the meeting, based on the respectively analyzed and categorized interactions and states of the meeting participant; and
program instructions to indicate, to a meeting host, that the meeting participant that is not paying attention using an avatar that represents the meeting participant.

14. The computer program product of claim 13, the stored program instructions further comprising:
program instructions to, upon detecting a lack of consensus on one or more topics using the machine learning algorithms, automatically schedule a follow-up meeting involving a subset of the original meeting participants; and
program instructions to, upon detecting a disruptive meeting participant in the meeting using the machine learning algorithms, automatically remove the disruptive meeting participant from the meeting.

15. A computer system comprising:
one or more computer processors;
one or more computer readable storage media;
program instructions stored on the computer readable storage media for execution by at least one of the one or more processors, the stored program instructions comprising:
program instructions to capture interpersonal interactions between people in a physical space during a period of time, using machine learning algorithms to detect the interpersonal interactions and a state of each person based on visual and audio sensors in the physical space;
program instructions to analyze and categorize the interactions and state of each person, and tag representations of each person with respectively analyzed and categorized interactions and states for the respective person over the period of time;
program instructions to determine levels of engagement for each person with respect to a speaker based, at least in part, on the respectively analyzed and categorized interactions and states for the respective person; and
program instructions to display the representations of each person on a screen, wherein the representations migrate toward the center of the screen in proportion to the determined levels of engagement for each person with respect to the speaker.

16. The computer system of claim 15, wherein the program instructions to capture interpersonal interactions between people in a physical space during a period of time comprise:
program instructions to collect data from a plurality of computing devices, wherein the plurality of computing devices includes a camera, a microphone, a heartrate monitor, and an infra-red camera.

17. The computer system of claim 15, wherein the program instructions to detect the interpersonal interactions and state of each person comprise:
program instructions to determine, using the machine learning algorithms, one or more states of a meeting participant, wherein the one or more states of the meeting participant are selected from the group consisting of:
an eye movement, a gaze, or pupil dilation,
a pulse rate,
an infra-red body heat pattern, and
a group interaction.

18. The computer system of claim 15, wherein the program instructions to analyze and categorize the interactions and state of each person, and tag representations of each person with the respectively analyzed and categorized interactions and states of the respective person over the period of time comprise:
program instructions to learn interactions and behaviors of each person over the period of time and tag representations of each person with data collected from a plurality of computing devices.

19. The computer system of claim 18, wherein the program instructions to tag representations of each person with data from a plurality of computing devices comprise:
program instructions to identify and isolate each person in a physical space using the data from the plurality of computing devices.

20. The computer system of claim 15, wherein the program instructions to display the representations of each person on a screen further comprise:
program instructions to display, on the screen, a unified meeting room with avatars that represent each person as a participant in a meeting, and wherein the stored program instructions further comprise:

program instructions to determine, using the machine learning algorithms, that a meeting participant is not paying attention to the meeting, based on the respectively analyzed and categorized interactions and states of the meeting participant; and program instructions to indicate, to a meeting host, that the meeting participant that is not paying attention using an avatar that represents the meeting participant.

* * * * *